United States Patent [19]
Benda

[11] Patent Number: 5,870,799
[45] Date of Patent: Feb. 16, 1999

[54] GROMMET

[76] Inventor: Steven J. Benda, 13657 10th St. Southwest, Cokato, Minn. 55321

[21] Appl. No.: 191,113

[22] Filed: Feb. 3, 1994

[51] Int. Cl.⁶ .................................................... F16L 5/00
[52] U.S. Cl. ................................................ 16/2.1
[58] Field of Search ........................... 16/2, 108; 174/656, 174/152 G, 153 G; 285/162, 196, 338; 220/307, DIG. 19

[56] References Cited

U.S. PATENT DOCUMENTS

| | | | |
|---|---|---|---|
| 4,041,241 | 8/1977 | Olmstead et al. | 174/153 G |
| 4,081,879 | 4/1978 | Rubright | 16/2 |
| 4,784,285 | 11/1988 | Patel | 220/307 |
| 5,211,695 | 5/1993 | Dowler | 174/65 G |
| 5,353,472 | 10/1994 | Benda et al. | 16/2 |

*Primary Examiner*—Chuck Y. Mah
*Attorney, Agent, or Firm*—Paul H. Gallagher

[57] ABSTRACT

A soft member constituting the main portion, and a rigid member. The soft member has a loop rib integral therewith, and the rigid member has a loop base element almost entirely embedded in the rib. The base element has load pads spaced therealong for lockingly engaging the panel in which the grommet is positioned.

10 Claims, 3 Drawing Sheets

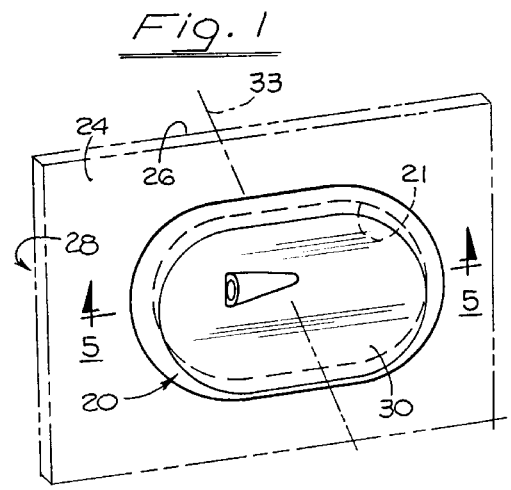
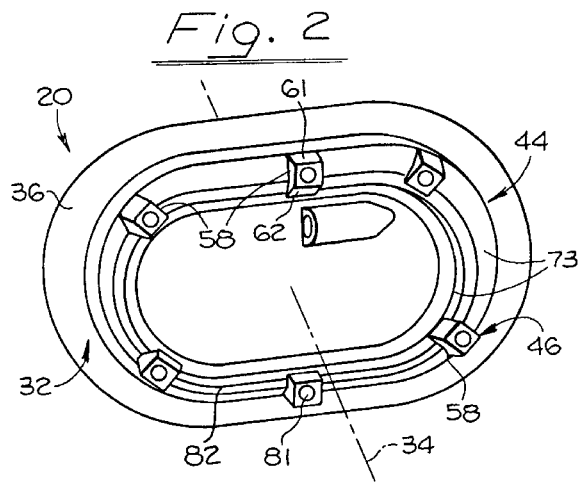
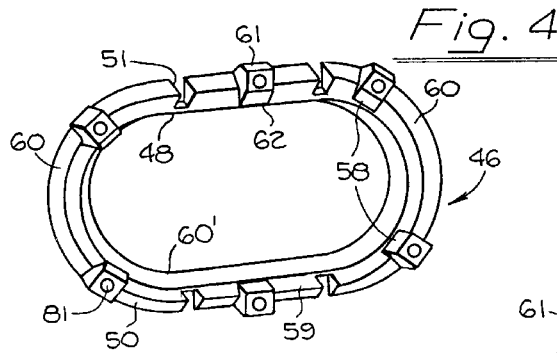
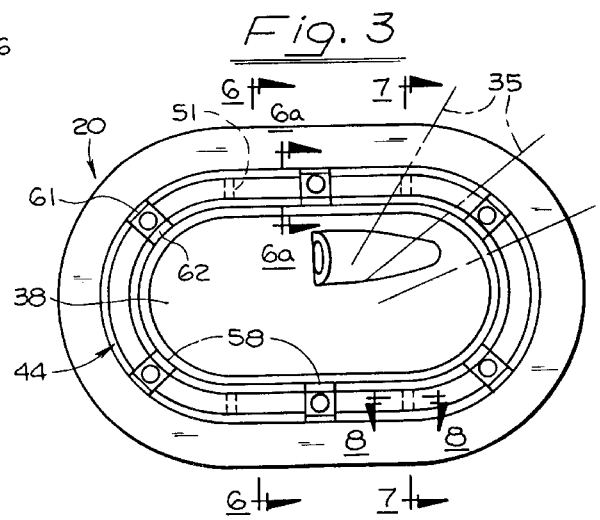
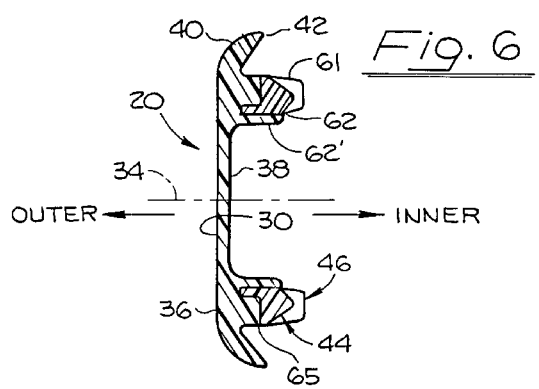
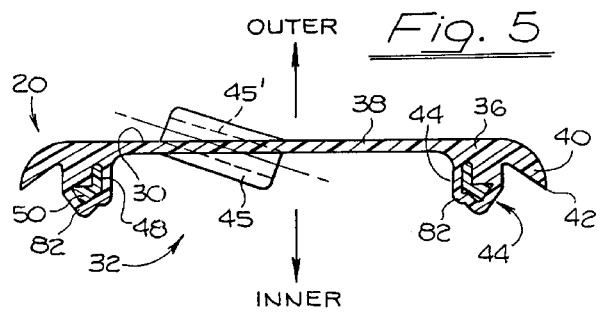

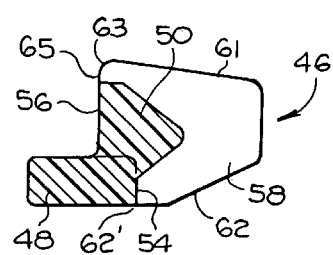
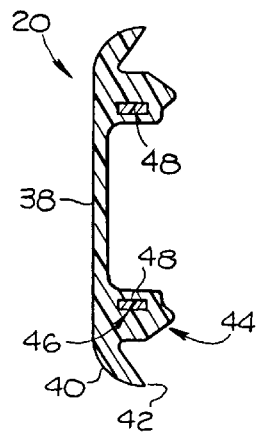
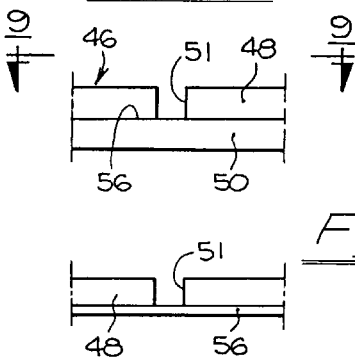
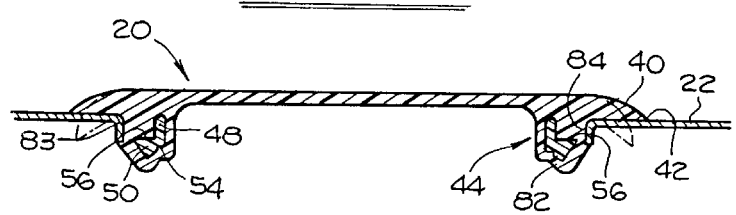
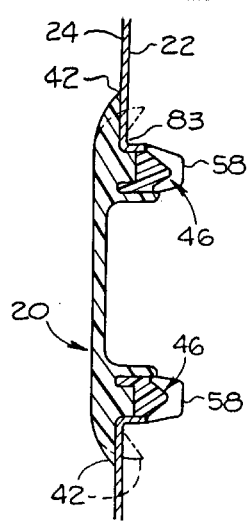
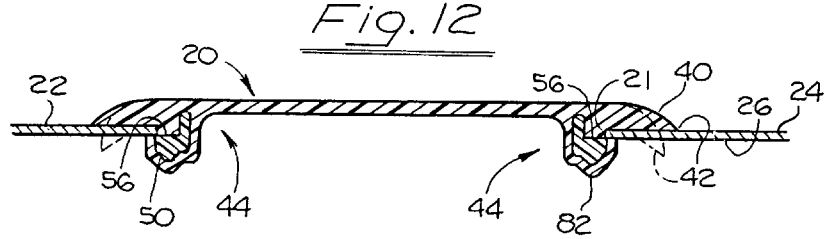
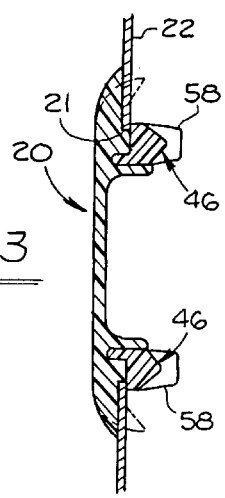

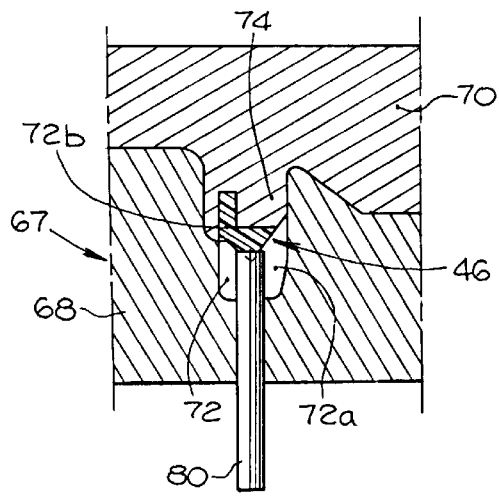
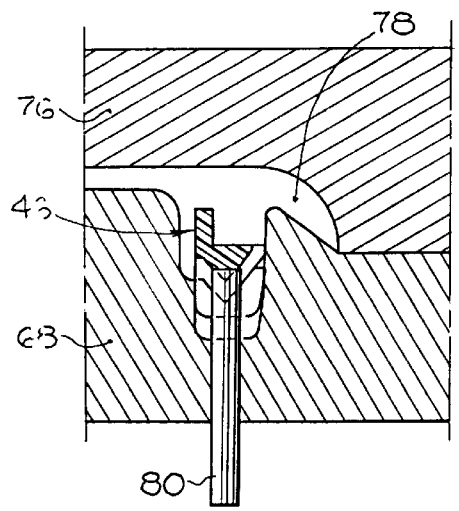
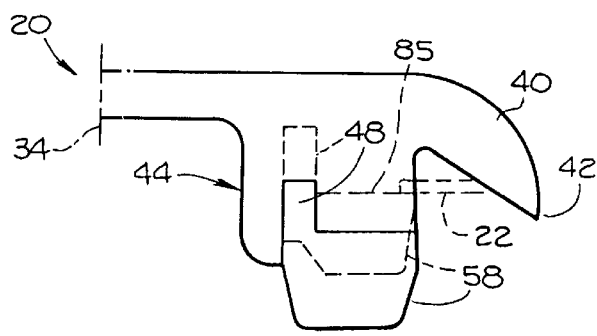

GROMMET

BRIEF SUMMARY OF THE INVENTION

The invention resides in the field of grommets used for filling or closing holes in a panel. In consideration of the background of the field of the invention, in the construction and installation of various items, panels are used for enclosing or isolating the items—isolating them from a hostile environment, and confining them in a clean room. Such panels are usually of sheet metal, and holes are provided in the panels which are to be filled or closed later. Such a hole may be used, for example, for insertion of an electric cable or a control cable that could not be installed otherwise, and it may be desired to close the hole with the cable extending therethrough. In another example, such a hole may be provided to enable access to a workman for performing a work manipulation through the hole, and then later the hole is to be closed, or plugged. Such holes are often referred to as penetrations or penetration holes, and the grommets are utilized for plugging those holes. Grommets quite often are made of plastic materials of predetermined different characteristics, for performing sealing functions, and locking functions, respectively. For this purpose the plastics are of soft material and rigid material respectively, heretofore firmly secured together in a dual durometer process to produce the desired unitary grommet, and when the grommet is inserted in the hole, the parts are positioned for sealing and locking respectively.

Such grommets generally have been subject to the objection that the soft material and the rigid material tend to be separated by the forces that are overcome in holding the grommet in place. The soft material and the rigid material in performing their respective functions work against each other and the forces thus involved tend to separate those two members. The members have interfacing surfaces of relatively great area that are secured together, or "welded", and the separating forces work in directions away from those interfacing surfaces. In such construction, the members are not mechanically connected together, at least to any appreciable extent.

The present invention involves a new concept, in the content of a grommet, and the practical steps in producing it. The grommet is made up of a soft member and a rigid member, as noted above, and heretofore a great portion, if not the entire, standard of procedure, involved different materials, of different characteristics, secured together. More specifically the materials are of plastic, and heretofore they were necessarily chemically compatible and thermally bondable. Consequently, there was little, or no, mechanical interlocking of the two materials. The strength of the grommet, as determined by the bonding of the two materials, was correspondingly limited, and it was correspondingly difficult to thermally bond the materials together in such a way as to produce the necessary strength for definitively securing them together. The present invention involves a new concept of mechanically interconnecting the two materials of the grommet. The materials are similar to those used heretofore, that is, of plastic, and including a soft material and a hard material, but they are interconnected in a mechanical way. More specifically, the two materials are molded, in a combined overall operation to form or produce the members independently, and in the overall operation to combine, or interconnect, the two materials in a single unitary end result—the grommet. Referring to the overall theory of construction and operation of the grommet, the grommet includes two members, a soft member of soft material principally for sealing, and a rigid member of hard material principally for locking. Those two materials, as indicated, are interlocked and more specifically the rigid member is embedded in the soft material, effectively completely, but leaving certain small elements exposed for specific steps in the locking function. In those areas where the rigid member is embedded in the soft material, the soft material is distributed completely around the rigid member, encasing or enveloping it, whereby the rigid member so embedded in the soft material, provides the strength for the end product, the grommet, and to a great extent determines its shape. Forming the entire end product, the grommet, in a mold, in this case involves two principal steps, first, forming and producing the rigid member made of the hard material in a first step of molding, and thereafter repositioning the molded hard member in the mold and then injecting the soft material into the mold in a manner in which it flows around and encases the rigid member in those areas predetermined. An end product is thus accomplished in which the two parts of the grommet are mechanically interconnected or interlocked, by encasement, i.e. the rigid member is effectively encased and completely enclosed in the soft member. The two members as thus formed and positioned provide the necessary and desired functions, sealing and locking respectively. This end result completely eliminates the necessity for obtaining strength by means of bonding.

In appreciation of the mechanical interlocking relation between the soft and rigid members it is pointed out that the soft member constitutes the larger portion of the complete grommet, and the rigid member a much smaller portion.

An additional advantageous feature of the device is that the soft member provides a maximum sealing effect with the panel, and specifically it provides, on one surface of the panel, sealing effect that is continuous and complete around the penetration hole, and on the other surface it engages the panel in nearly a continuous peripheral area.

A further advantage of the invention is that because the rigid member is substantially embedded in the soft member, the grommet eliminates the requirement for materials having chemical compatibility, and thermal bondability, since the members are held together by encasement. However, the invention is adapted to the use of those materials, if it should be so desired.

An additional advantage is that the grommet is of such design that it can be predetermined in design and dimensions, according to its intended use, so that it is "tunable" for producing uniform effect in different sizes of grommet, this with a minimum of, or virtually no, change in the design of the mold in which the grommet is molded.

BRIEF DESCRIPTION OF THE INDIVIDUAL FIGURES OF THE DRAWING

FIG. 1 is a perspective view of a grommet of the invention, in place in a panel, showing the outer surface of the grommet.

FIG. 2 is a perspective view of the inner surface of the grommet.

FIG. 3 is a face view of the inner surface of the grommet.

FIG. 4 is a perspective view, oriented according to FIG. 2, of the rigid member isolated.

FIG. 4a is a fragmentary perspective view of an end portion of the rigid member taken from the side opposite that shown in FIG. 4.

FIG. 5 is a sectional view taken at line 5—5 of FIG. 1.

FIG. 6 is a sectional view taken at line 6—6 of FIG. 3.

FIG. 6a is a large scale view of the rigid member as shown in FIG. 6.

FIG. 7 is a sectional view taken at line 7—7 of FIG. 3.

FIG. 8 is a fragmentary view taken at line 8—8 of FIG. 3.

FIG. 9 is a view taken at line 9—9 of FIG. 8.

FIG. 10 is a view similar to FIG. 5, but showing the grommet in place in the panel.

FIG. 11 is a view similar to FIG. 6, but showing the grommet in place in the panel.

FIG. 12 is a view similar to FIG. 10 but showing the grommet in a panel of different form.

FIG. 13 is a view similar to FIG. 11 but showing the grommet in a panel similar to that of FIG. 12.

FIG. 14 is a view of a mold in which the rigid member is molded.

FIG. 15 shows a mold, having the lower part of the mold of FIG. 14 and an upper part of different form.

FIG. 16 is a view similar to the right hand portion of FIG. 5 but showing alternate dimensions of certain of the elements of the grommets.

Referring in detail to the drawings, attention is directed first to FIG. 1, which shows a grommet 20 in place in a hole 21 in a panel 22. As indicated above, the panel is used for enclosing or confining a certain space that contains items being constructed or manipulated. The panel thus forms what is often referred to as an inner clean room, protecting it from the outer hostile environment, thus having an outer surface 24, and an inner surface 26 exposed to the inner space, indicated at 28. For facilitating reference to the various elements, the grommet in closing position (FIG. 1) in the hole in the panel, is oriented according to the panel, having an outer surface 30 oriented according to the outer surface 24 of the panel. Correspondingly, the grommet has an inner surface 32 (FIG. 2) oriented according to the inner surface 26 of the panel. The hole 21 is a penetration, or a penetration hole, identified above.

An axis 33 is identified, extending through the penetration hole in direction essentially perpendicular to the panel, utilized for assisting in referring to the elements. Similarly, an axis 34 is identified through the grommet, this axis being parallel with, or coaxial with, the axis 33 when the grommet is in closing position (FIG. 1). The term parallel as used herein is considered generic to include also coaxial. Similarly, the grommet is considered as having radiating lines 35 (FIG. 3), indicating directions from the central portion outwardly, although the article is not round. These axial and radiating lines are shown in other figures also to facilitate orientation of various elements.

The grommet is a unitary article, although made up of soft Shore and rigid Shore members, referred to. FIG. 2 shows the grommet in its entirety, and FIG. 4 shows the rigid member, isolated. The soft member indicated at 36 is best shown in FIGS. 2, 5, 6 and constitutes the major portion of the grommet, and determines its peripheral limits. The grommet may be of any outline shape, according to the shape of the penetration hole to be filled, it being shown in oblong or oval shape, in the present case. The soft member 36 includes a body or main portion 38 (FIG. 5) that is generally flat, or nearly planar, although this shape is not critical. The body defines the outer surface 30 (FIG. 1), and the soft member includes a peripheral sealing element 40, curved away from the outer surface 30 in the direction of the inner surface 32, and terminates in a thin sealing peripheral edge 42.

The peripheral sealing element 40 thickens in radially inward direction where it merges with a rib 44 on the inner surface of the body. This rib is a continuous loop extending around the grommet (FIG. 2), and is shaped similar to the outline shape of the grommet. The details of this rib will be referred to below, it being pointed out that the rigid member is essentially embedded in this rib.

Radially inwardly of the rib 44, the body 38 is relatively thin. Formed in the body 38, and integral therewith, is a cable passage element 45 extending therethrough, and defining a cable hole 45' for the insertion of a cable from the exterior through the grommet. Since the penetration hole 21 may be provided for any of various purposes, such as providing access of a workman to items on the inner side, this cable hole is not of the essence of the present invention, and may be omitted when not required.

The soft member 36, as will be understood, is highly flexible and this feature provides effective sealing around the marginal edge of the penetration hole in the panel.

The rigid member 46 shown in perspective, in its entirety, in FIG. 4, is also of the same outline shape of the grommet, and particularly of the rib 44, in which it is embedded. The rigid member is a one-piece integral molded member and includes a continuous loop base element or band 48 (FIGS. 4a, 5), rectangular in cross section, and an axially inner, radially outer, element 50. The latter, which may also be referred to as a bead, has slits 51 (FIG. 4) at the sides of the loop. The element 50 is generally triangular in cross section (FIGS. 6, 6a), and is offset radially outwardly from the band 48, forming an axially inwardly directed shoulder 54 and an axially outwardly directed shoulder 56.

At selected positions along the rigid member are axially inwardly extending load pads 58, in this case six in number. The load pads are integral with the elements 48 and 50 and are relatively heavy and massive. The rigid member 46 (FIG. 4) has long side runs 59 that are relatively straight, and curved end runs 60 that are substantially semi-circular in shape forming junctures 60' between adjacent runs. The load pads include one adjacent the middle of each side run, and one each adjacent the juncture of each side run and the end run. The slits 51 are four in number, being only at the sides, between each side load pad and the adjacent load pads at the junctures of the straight and curved runs. The side surfaces of the load pads diverge in axially outward direction as indicated at 61, 62 (FIGS. 4 and 6a), the surface 62 merging into the radially inner side surface of the inner element 48 at 62' (FIG. 6a), and the radially outer surface 61 terminating at 63, the latter forming a shoulder 65. Each load pad may have a dimension, linearly of the rib, of about 7/16 inch, while the overall length of the grommet may be about 4-1/4 inches. These dimensions of course are only examples.

FIGS. 14 and 15 show a mold in which the grommet is molded. In FIG. 14 a mold 67 includes a bottom part 68 and a top part 70. The bottom part has a cavity 72 for forming the axially inner surface of the rigid member, including a deep portion 72a and a top portion 72b. The top part has a projection 74 producing the axially outer surface of the rigid member.

The rigid member is molded in the mold as shown in FIG. 14, and in FIG. 15 the same bottom part 68 is used, but a different top part 76 is utilized, having a cavity 78 cooperating with the bottom part for molding the soft member.

Pins 80 extend into the cavity 72 in a lower position in FIG. 14, in which the rigid member is molded, and then after the step of molding the rigid member is completed, the pins are raised to the position shown in FIG. 15, raising the rigid member. These pins are located at the positions of the load pads, this positioning being evidenced by the holes 81 in the load pads (FIGS. 2–4).

After the foregoing molding step, and after the pins 80 are raised, the plastic for forming the soft member is injected in the cavity 78, the plastic running also into the cavity 72 to the extent possible. This plastic that enters the cavity 72 forms a skin 82 around the rigid member except for the load pads, the skin being shown in FIGS. 2 and 5. The triangular shape of the element 50 (FIGS. 5, 6) is of importance in forming the skin. Because of the inclined surfaces of that triangular shape, the soft plastic flows more freely into the mold cavity and thereby more effectively completely surrounds the element 50. In FIG. 2 the skin is seen to entirely cover the rigid member except for the load pads, the latter being exposed therethrough. The portion of each load pad that is so exposed through the skin, is that portion that contains the two diverging surfaces 61, 62 (FIG. 6). This skin is integral with and continues from the body 38 and peripheral portion 40, respectively (FIGS. 5, 7).

To insert the grommet into the penetration hole, the grommet is fitted to the panel and then pushed into position, with the rib 44 being pushed through the hole. It is so pushed or moved until it snaps into closing position, in which it both seals the hole and locks the grommet in place. If the grommet is made to accommodate a cable in the hole 45', the cable is first inserted in the hole and then the grommet is put in place. But when the grommet is to be used only to fill the penetration hole, without a cable, the step of pushing the grommet into closing position is the same.

More specifically, the grommet is pushed into place by inserting an end portion loop of the rib 44 in first and then pushing the other end into position. This performs a limited compressing or squeezing action, because the dimensions of the radially outer surfaces of the load pads 58, taken together, are slightly larger than the corresponding direction of the peripheral edge of the penetration hole 21. In this step the outer inclined camming surfaces 61 (FIG. 6) of the load pads engage the edge of the penetration hole and the load pads are pushed radially inwardly, in a camming action, until the shoulders 65 on the load pads are moved beyond the edge of the panel, and they then snap out and engage the panel on the inner surface thereof. This locking position is shown in FIG. 11.

It is pointed out that in FIGS. 10 and 11 the panel 22 has an inturned flange 83, and in FIG. 11 it is shown where the shoulders 65 engage the inner edge of that flange. The peripheral sealing element 40 is positioned and dimensioned so that when the grommet is moved into closing position, the sealing edge 42 engages the surface of the panel and the peripheral portion is flexed axially outwardly and that sealing portion is consequently biased against the panel. The sealing edge is shown in dot dash lines in its normal position.

In the closing position just referred to, and at locations other than at the load pads, as shown in FIG. 10, the marginal edge of the penetration hole firmly engages the skin 82 at points 84 (FIG. 10) and performs a good sealing effect. Consequently, the penetration hole is sealed, on the outer surface of the panel, completely around the grommet, by the edge 42, while on the inner surface, it is sealed nearly entirely around the rib by the skin 82, leaving only those points where the load pads engage the panel, and in the latter case, the load pads also produce a certain sealing effect.

While the grommet is effective for use in connection with a penetration hole of the specific form shown in FIGS. 10 and 11, it is also effective for use with a panel where it does not have such a flange 83. The latter situation is shown in FIGS. 12 and 13, where the panel 22 has a penetration hole 21 the marginal edge of which lies within the limits between the outer and inner surfaces of the panel. In this case the edge of the hole engages the skin of the rib 44 as before, and also the load pads engage the inner surface 26. In the latter case, the dimensions of the rigid member are preselected to accommodate such form of panel, i.e., not having the flange 83. This latter feature is considered important in that because of the design of the device, it can be predesigned in dimensions and shape with a minimum or no change in the design of the mold.

Attention is directed to FIG. 16 which shows a fragment of the grommet corresponding to the right hand portion of FIG. 5. The rib 44 is relatively thick in axial direction, i.e. in the direction of the axis 34 and thicker than the corresponding direction of the load pad 58. In one case, the recess 72 of the mold (FIG. 14) is relatively deep, forming the load pad 58 (FIG. 16) of the size shown in full lines, i.e., a relatively great dimension axially of the grommet. This position or dimension of the grommet will accommodate the flange 83 (FIG. 10); however, the recess 72 may be shallower, producing a grommet dimension represented by the dotted line position (FIG. 16) in which the axial dimension of the grommet is relatively less. In the first case the flange 83 (FIG. 10) engages the soft member, and the shoulder 65 (FIG. 6a) on the load pad engages the edge of the flange. The dimensions are such that the soft material is biased against the flange securely, forming a continuous seal around the grommet. In between the load pads, the shoulder 56 on the skin also engages the flange.

In the case of the lesser dimension of the grommet (FIG. 16) a panel 22 (FIGS. 12, 13) without the flange, is accommodated by the load pads of the dimensions and locations shown in dotted lines at 85 in FIG. 16.

Because of the relatively small transverse dimensions of the rigid member, and the slits therein, the grommet is highly tunable, i.e., it can easily be predesigned of different dimensions, and to accommodate different sizes and shapes of penetration holes. Other features contributing to this advantage: the height of the load pads (in axial direction) can be predesigned; pulling-apart forces between the rigid and soft members are eliminated; because of the small total linear dimension of the rigid member relative to that of the soft member, great locking effect is achieved together with great sealing effect by the soft member; because of the effective encasement of the rigid member within the soft member, greater flexibility in the selection of plastics is provided.

As noted above, the materials of the soft and rigid members need not be chemically compatible or thermally bondable, because of the effective encasement of the rigid member in the soft member. However, it is within the scope of the invention that, if it should be desired, the two materials be so chemically compatible and thermally bondable, and that they be bonded. Any of a wide variety of materials may be used, but for convenience, the following are examples of plastic materials that may be used to make up the members.

EXAMPLE I:

Rigid material: Krayton (Shell Corp.) in the range of Shore D hardness.

Soft material: Krayton (Shell Corp.) in the range of Shore A softness.

EXAMPLE II:

Rigid material: Hytrel (DuPont Corp.) in the range of Shore D hardness.

Soft material: Alcryn (DuPont Corp.) in the range of Shore A softness.

End of Descriptive Specification

I claim:

1. A grommet for closing a penetration hole through a panel having an outer surface and an inner surface, the hole having an axis extending essentially perpendicular to the panel, the grommet when in position closing the hole having an outer surface and an inner surface oriented respectively to the outer surface and the inner surface of the panel, and having an axis positioned parallel with said axis through the penetration hole, said grommet comprising, a main soft member of Shore A softness, defining the peripheral limits of the grommet and constituting the largest portion of the grommet, the soft member having a central closing portion extending over the penetration hole when the grommet is in closing position, and having a continuous peripheral sealing element terminating in an outer peripheral sealing edge, the soft member including an integral rib on its inner surface similar in outline shape to the soft member and positioned closely adjacent to the peripheral sealing edge, a rigid member, of Shore D hardness, including a base element and having an outline shape similar to that of the rib, and including load pads distributed along the base element, the base element being entirely embedded in the rib and the load pads being exposed to the exterior of the rib, and the rigid member being thereby effectively embedded in the rib, the base element and the load pads being contained within the limits of the rib in radial direction, and the grommet when in closing position being so positioned that the peripheral sealing element and the load pads engage respective ones of said surfaces of the panel and thereby lockingly and sealingly hold the grommet in place in closing position, the rib forming a skin surrounding the entire rigid base element between the load pads.

2. A grommet according to claim 1 wherein, the load pads extend inwardly in axial direction beyond said skin of the rib, and the axially outer surfaces of load pads, in their exposed portions, are inclined axially outwardly and radially inwardly, for forming camming surfaces for engaging the marginal edge surface of the penetration hole.

3. A grommet for closing a penetration hole through a panel having an outer surface and an inner surface, the hole having an axis extending essentially perpendicular to the panel, the grommet when in position closing the hole having an outer surface and an inner surface oriented respectively to the outer surface and the inner surface of the panel, and having an axis positioned parallel with said axis through the penetration hole, said grommet including constructional elements, a main soft member, of molded plastic of Shore A softness, defining the peripheral limits of the grommet and constituting the largest portion of the grommet, the soft member having a central closing portion extending over the penetration hole when the grommet is in closing position, and having a continuous peripheral sealing element terminating in an outer peripheral sealing edge, the soft member including an integral rib on its inner surface similar in outline shape to the soft member and positioned closely adjacent to the peripheral sealing edge, a rigid member, of molded plastic of Shore D hardness, including a base element, and having an outline shape similar to that of the rib, and including load pads distributed along the base element, the base element being entirely embedded in the rib and the load pads being exposed to the exterior of the rib, and the rigid member being thereby effectively embedded in the rib, the base element and the load pads being contained within the limits of the rib in radial direction, the grommet when in closing position being so positioned that the peripheral sealing element and the load pads engage respective ones of said surfaces of the panel and thereby lockingly and sealingly hold the grommet in place in closing position, the peripheral sealing element on the soft member engaging the outer surface of the panel along a circumferential line radially outwardly beyond the penetration hole, the peripheral sealing element extending radially outwardly from the central closing portion, and curving in the direction toward the inner surface of the grommet, and having a normal curved position, the dimension and proportions of the constructional elements of the grommet being such that when the grommet is in closing position, the peripheral sealing element is in a position displaced in axial direction from its normal position toward a flattened position.

4. A grommet according to claim 3 wherein, the peripheral sealing element, as measured in cross section, has a relatively thick dimension at its radially inner portion and decreases in thickness radially outwardly and terminates in a thin peripheral sealing edge at its periphery.

5. A grommet according to claim 4 wherein, the rib forms a skin surrounding the entire base element between the load pads, and the marginal edge surface of the penetration hole engages said skin and the elements being so relatively dimensioned that said marginal edge surface compresses said skin relative to the normal dimension of the latter.

6. A grommet for closing a penetration hole through a panel having an outer surface and an inner surface, the hole having an axis extending essentially perpendicular to the panel, the grommet when in position closing the hole having an outer surface and an inner surface oriented respectively to the outer surface and the inner surface of the panel, and having an axis positioned parallel with said axis through the penetration hole, said grommet comprising, a main soft member of Shore A softness, defining the peripheral limits of the grommet and constituting the largest portion of the grommet, the soft member having a central closing portion extending over the penetration hole when the grommet is in closing position, and having a continuous peripheral sealing element terminating in an outer peripheral sealing edge, the soft member including an integral rib on its inner surface similar in outline shape to the soft member and positioned closely adjacent to the peripheral sealing edge, a rigid member, of Shore D hardness, including a base element, and having an outline shape similar to that of the rib and including load pads distributed along the base element, the base element being entirely embedded in the rib and the load pads being exposed to the exterior of the rib, and the rigid member being thereby effectively embedded in the rib, the base element and the load pads being contained within the limits of the rib in radial direction, and the grommet when in closing position being so positioned that the peripheral sealing element and the load pads engage respective ones of said surfaces of the panel and thereby lockingly and sealingly hold the grommet in place in closing position, the base element having slits at positions between the load pads extending partially therethrough in axial direction providing pliability to the base element.

7. A grommet according to claim 6 wherein, the base element is of elongated shape having straight side runs, and arcuate end runs, forming junctures respectively between the side runs and the end runs;

the load pads are positioned respectively in the side runs and at said junctures, and said slits are positioned in the side runs.

8. A grommet according to claim 6 wherein, the base element includes a continuous band substantially rectangular in cross section and a bead at the axially inner end of the band, said bead forms a first shoulder directed axially outwardly, and each load pad forms a second shoulder directed axially outwardly, and extending radially outwardly beyond said first shoulder.

9. A grommet according to claim 8 wherein, the second shoulder is also positioned axially outwardly beyond the first shoulder.

10. A grommet according to claim 9 wherein, said bead is of triangular shape in cross section having an apex directed axially inwardly.

* * * * *